United States Patent [19]

Johnson

[11] Patent Number: 5,086,684

[45] Date of Patent: Feb. 11, 1992

[54] TRANSPORTABLE WORK MACHINE HAVING A STABILIZER LEG WITH SELECTIVELY OPERABLE AUXILIARY SAW MEANS

[75] Inventor: Calvin S. Johnson, Union Grove, N.C.

[73] Assignee: CTR Manufacturing, Inc., Union Grove, N.C.

[21] Appl. No.: 609,418

[22] Filed: Nov. 5, 1990

[51] Int. Cl.⁵ .............................................. A01G 23/08
[52] U.S. Cl. ....................................... 83/795; 83/928; 144/34 R
[58] Field of Search ................. 83/794, 975, 976, 928; 294/86.4, 86.41, 86.42; 144/34 R, 218

[56] References Cited

U.S. PATENT DOCUMENTS

| | | | |
|---|---|---|---|
| 2,755,570 | 7/1956 | Blackburn et al. | 83/796 |
| 3,796,242 | 3/1974 | Albright | 83/928 |
| 3,972,357 | 8/1976 | Neal et al. | 83/928 |
| 4,832,412 | 5/1989 | Bertrand | 83/928 |

Primary Examiner—Mark Rosenbaum
Assistant Examiner—Allan M. Schrock
Attorney, Agent, or Firm—Shefte, Pinckney & Sawyer

[57] ABSTRACT

In an off-road vehicle or other transportable apparatus of the type having ground-engageable stabilizer legs, such as a knuckleboom loader, one of the stabilizer legs is equipped with a pivotable chain saw mechanism hydraulically-operated from an operator compartment for use in performing occasional cutting operations attendant to normal usage of the vehicle or apparatus.

8 Claims, 2 Drawing Sheets

TRANSPORTABLE WORK MACHINE HAVING A STABILIZER LEG WITH SELECTIVELY OPERABLE AUXILIARY SAW MEANS

BACKGROUND OF THE INVENTION

The present invention relates to off-road vehicles and other transportable work machinery of the type having ground engaging stabilizer legs, for example, vehicles of such type used in the logging industry.

Most conventional off-road work vehicles are equipped with one or more pairs of selectively operable stabilizer legs which are normally retracted out of ground engagement during traveling movement of the vehicle but which may be selectively moved into ground engagement when the vehicle is stopped to fix the vehicle body in a stationary work position. Other transportable work machinery may similarly be equipped with stabilizer legs to facilitate in-field use. Most such vehicles and machinery have a relatively specialized function and operation. For example, one conventional off-road vehicle utilized in the logging industry is a mobile truck-mounted crane, commonly referred to as a knuckleboom loader, which is equipped with an elongated boom mounted on a supporting bed portion of the vehicle with a grapple assembly supported at the distal end of the boom for selective lifting and movement of large logs. Typically, the vehicle frame of a knuckleboom loader is equipped with two pairs of stabilizer legs to rigidify the vehicle frame with respect to the adjacent ground when the boom and grapple arrangement is being operated.

One common use of such a knuckleboom loader is to load tree-length or other large logs onto a trailer or truck bed for transportation away from a logging site. In the course of such operations, it is not uncommon for it to be necessary or desirable to cut or trim some logs being loaded. However, because of the singular function of a knuckleboom loader, the loader is not capable of performing any such cutting operations and instead another piece of logging equipment or a manually operated saw must be utilized in such cases or, if not available, the log must be left untrimmed.

SUMMARY OF THE INVENTION

The present invention provides an improvement in off-road vehicles and other transportable apparatus of the type having selectively operable stabilizer legs, which improvement substantially overcomes the above-described problem. Briefly summarized, according to the improvement of the present invention, one of the stabilizer legs of such an apparatus is provided with a saw arrangement movably mounted to the stabilizer leg for selective operative cutting movement when the stabilizer leg is in its ground-engaging stationary work position. As such, the saw arrangement provides the vehicle or apparatus with an auxiliary capability for sawing logs or other similar cutting operations when necessary or desirable, without requiring the presence of another work vehicle or other piece of work equipment.

According to the preferred embodiment of the present invention, the saw arrangement is a chain saw assembly pivotably mounted to the stabilizer leg for cutting movement outwardly with respect to the stabilizer leg between a resting position generally housed by the stabilizer leg and an operative position extending outwardly therefrom. A suitable arrangement is provided for selectively actuating pivoting movement of the saw, e.g., a hydraulic piston-and-cylinder assembly or the like. It is further preferred that the one stabilizer leg include a sawbuck portion adapted to support a log or other article in cutting position relative to the saw arrangement.

DESCRIPTION OF THE PREFERRED EMBODIMENT

Figure 1:
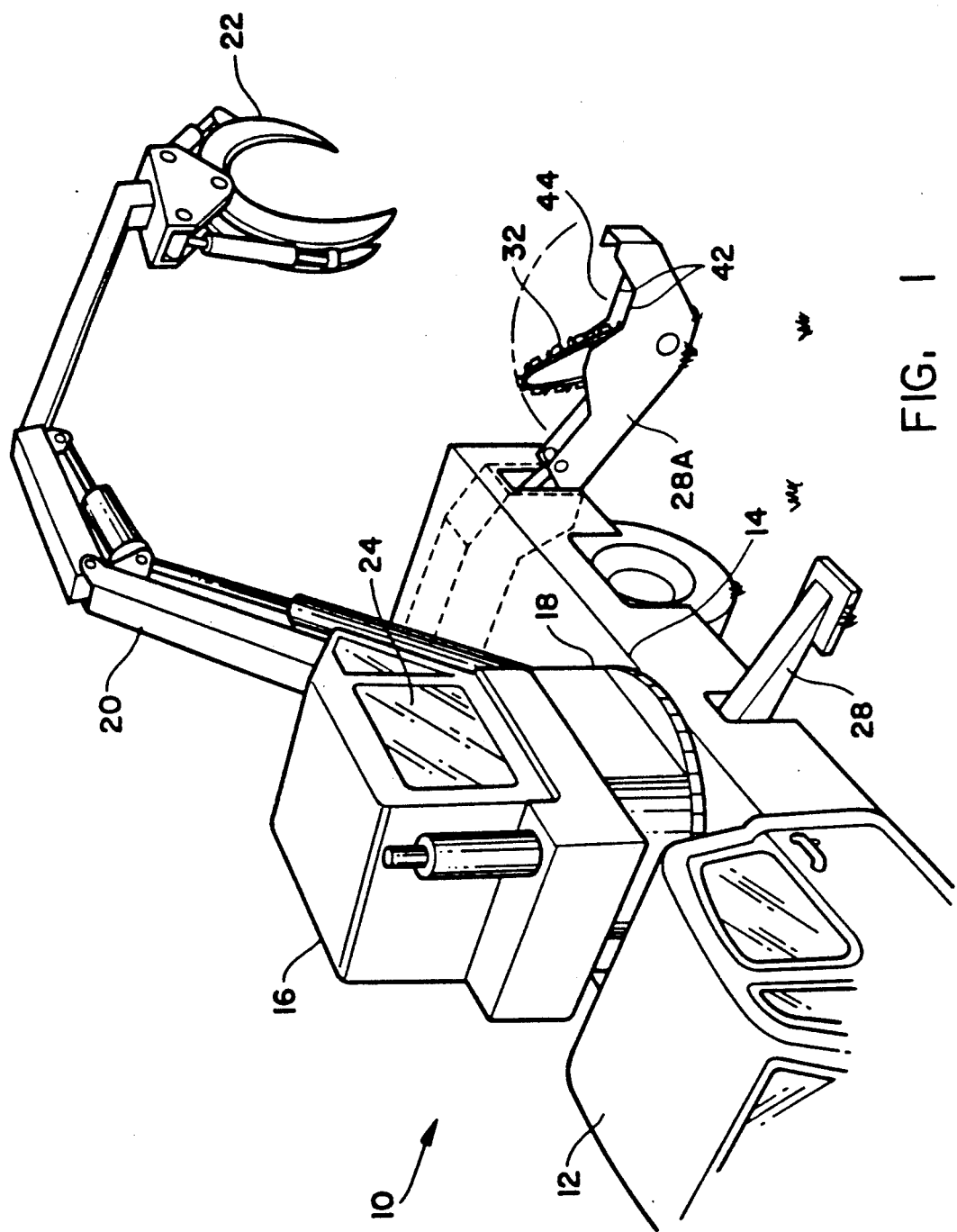
FIG. 1 is a perspective view of a conventional knuckleboom loader, one stabilizer leg of which is equipped with saw means according to the preferred embodiment of the present invention.

Referring now to the accompanying drawings and initially to FIG. 1, a conventional mobile crane of the type commonly referred to in the logging industry as a knuckleboom loader is generally indicated at 10. The basic construction and operation of knuckleboom loaders are widely known and understood within the logging industry and, accordingly, the loader 10 is illustrated and described herein only to the extent necessary to facilitate an understanding of the present invention. The knuckleboom loader 10 basically is an off-road truck-like vehicle 12 having a supporting bed 14 on which a crane assembly 16 is mounted by a turret assembly 18 for rotational movement about a vertical axis. The crane assembly 16 basically includes a elongate articulable boom 20 mounted at one end to the turret 18 and having a grapple assembly 22 mounted at the outward distal end of the boom 20. Rotation of the turret 18, articulation of the boom 20 and opening and closing movements of the grapple 22 are controlled from an operator compartment 24 also mounted on the turret 18. Typically, the crane assembly 16 is equipped with a hydraulic pump and motor (not shown) by which the operational movements of the components of the crane assembly 16 may be controlled.

Figure 2:
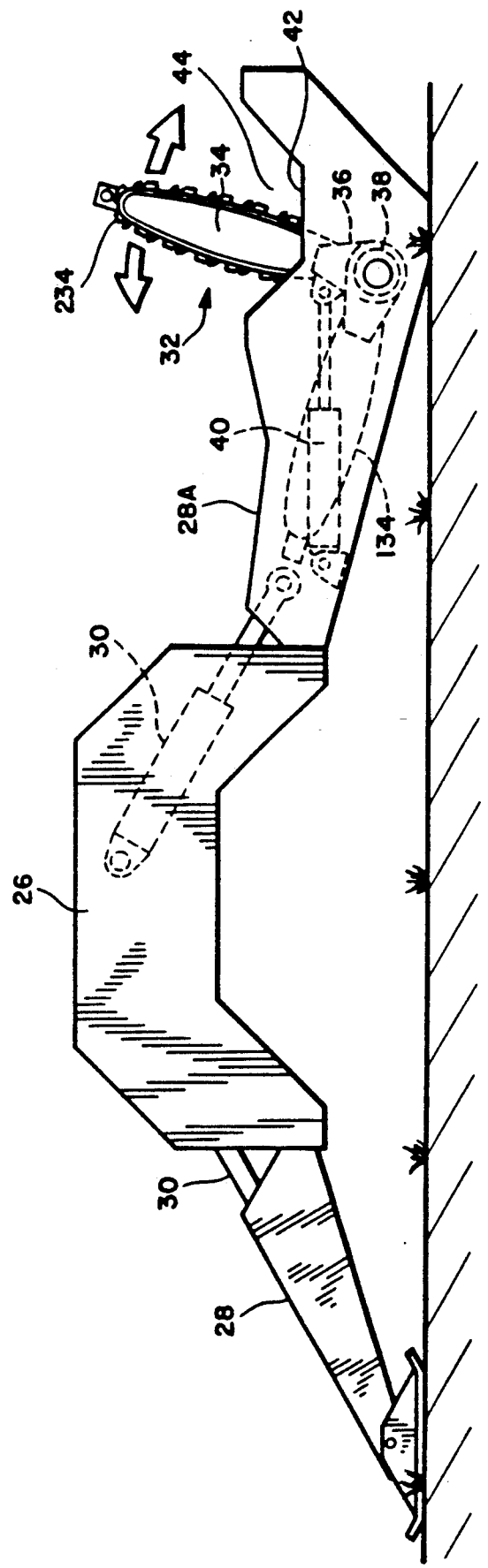
FIG. 2 is a vertical cross-sectional view of the frame of the knuckleboom loader of FIG. 1, taken along line 2—2 thereof.

As shown in FIGS. 1 and 2, the frame 26 (FIG. 2) of the knuckleboom loader 10 has two pair of stabilizer legs 28 pivotably mounted thereto for selective movement vertically into and out of ground engagement through individual hydraulic piston-and-cylinder assemblies 30 each extending between the frame 26 and a respective one of the stabilizer legs 28. The piston-and-cylinder assemblies 30 are also operatively controlled from the hydraulic pump and motor arrangement of the knuckleboom loader 10. As is well-known, the stabilizer legs 28 are pivoted upwardly to an inoperative position during normal traveling movement of the loader 10 but, when the loader 10 is stopped at a work site whereat the crane assembly 16 of the loader is to be operated, the stabilizer legs 28 are pivoted downwardly into ground engagement to rigidify the frame 26 of the loader 10 with respect to the adjacent ground on which the loader 10 is supported.

As best seen in FIG. 2 one of the stabilizer legs 28A is equipped with an auxiliary saw assembly, generally indicated at 32. The stabilizer leg 28A is of an upwardly open channel-like configuration. Preferably, the saw assembly 32 is a conventional chain saw mechanism pivotably mounted within the channel area of the stabilizer leg 28A. Basically, the chain saw mechanism 32 includes a rotational bearing assembly 36 mounted within the stabilizer leg 28A adjacent its outward end, with an elongate saw bar 34 extending outwardly from the bearing assembly 36 to be pivotably movable upon rotation thereof through a cutting path in a vertical plane between a fully-retracted inoperative position wherein the saw bar 34 is completely housed within the channel area of the stabilizer leg 28A, as shown at 134 in FIG. 2, to a fully-extended position wherein the saw bar 34 extends vertically outwardly from the stabilizer leg 28A, as shown at 234 in FIG. 2. A continuous saw chain (not shown) is trained about the perimeter of the saw bar 34 in conventional fashion and is driven by a hydraulic motor 38 mounted on the bearing assembly 36.

Pivotal movement of the saw bar 34 is actuated by a hydraulically-operated piston-and-cylinder assembly 40 mounted at one end to the interior of the stabilizer leg 28A and at the opposite end to the bearing assembly 36. The hydraulic motor 38 and the piston-and-cylinder assembly 40 are supplied with pressurized hydraulic fluid from the hydraulic motor and pump arrangement of the crane assembly 16 and are controlled from the operator compartment 24 in the same fashion as the other operating motions of the knuckleboom loader 10.

The upwardly facing edges 42 of the stabilizer leg 28A at opposite sides of its channel area are configured to form a generally U-shaped receiving area 44 which acts generally in the nature of a sawbuck to support logs or other items to be cut by the chain saw mechanism 32 during operating pivotal movements of the saw bar 34.

The operation and advantages of the present invention may thus be understood. In the ordinary operation of the knuckleboom loader 10, the stabilizer legs 28, including the stabilizer leg 28A, may be pivoted downwardly into ground engagement to stabilize the frame 26 of the loader 10. In normal operation of the loader 10, the chain mechanism 32 remains retracted within the channel area of the stabilizer leg 28A. When logs or other items being handled by the loader 10 may require special cutting or trimming, the operator of the loader 10 may manipulate the grapple 22 to place the log or other item in the saw buck area 44 of the stabilizer leg 28A and then actuate the chain saw mechanism 32 to drive the saw chain and pivot the saw bar 34 to cut the log or other item. In this manner, the chain saw mechanism 32 satisfies the occasional need for a chain saw or other cutting equipment during the ordinary usage of the knuckleboom loader 10, thereby eliminating the need for manual operation of a chain saw or other separate piece of cutting equipment. Since the chain saw mechanism 32 is controlled from the operator compartment 24 of the knuckleboom loader 10, such occasional cutting operations may be more conveniently and expeditiously completed in any event.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. For example, the present invention may be incorporated, as appropriate or desirable, in a stabilizer leg of any other type of work vehicle or other work machinery. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In a transportable apparatus of the type having selectively operable stabilizer legs mounted to said apparatus in a first area and movable into and out of ground engagement to fix said apparatus in a stationary work position and having boom means mounted to said apparatus in a second area, the improvement comprising saw means movably mounted directly to one said stabilizer leg for selective operative cutting movement only when said one stabilizer leg is in its ground-engaging stationary work position.

2. The improvement in a transportable apparatus according to claim 1 and characterized further in that said saw means is pivotable with respect to said one stabilizer leg for cutting movement outwardly with respect thereto.

3. The improvement in a transportable apparatus according to claim 2 and characterized further in that said saw means is movable between a resting position generally housed by said one stabilizer leg and an operative position extending outwardly therefrom.

4. The improvement in a transportable apparatus according to claim 3 and characterized further by means for selectively actuating pivoting movement of said saw means.

5. The improvement in a transportable apparatus according to claim 1 and characterized further in that said one stabilizer leg comprises a sawbuck portion for supporting an article in cutting position relative to said saw means.

6. The improvement in a transportable apparatus according to claim 1 and characterized further in that said saw means comprises a chain saw assembly.

7. In a transportable apparatus of the type having selectively operable stabilizer legs mounted into and out of ground engagement to fix said apparatus in a stationary work position, the improvement comprising saw means movably mounted to one said stabilizer leg for selective operative cutting movement when said one stabilizer leg is in its ground-engaging stationary work position; said one stabilizer leg having a sawbuck portion for supporting an article in cutting position relative to said saw means.

8. In a transportable apparatus of the type having selectively operable stabilizer legs movable into and out of ground engagement to fix said apparatus in a stationary work position, the improvement comprising a chain saw assembly pivotably mounted directly to one said stabilizer leg for selective operative cutting movement when said one stabilizer leg is in its ground-engaging stationary work position.

* * * * *

UNITED STATES PATENT AND TRADEMARK OFFICE
CERTIFICATE OF CORRECTION

PATENT NO. : 5,086,684

DATED : Feb. 11, 1992

INVENTOR(S) : Calvin S. Johnson

It is certified that error appears in the above-identified patent and that said Letters Patent is hereby corrected as shown below:

Column 2, Line 33, before "elongate" delete "a" and insert -- an -- therefor.

Column 2, Line 62, delete "FIG. 2" and insert -- FIG. 2, -- therefor.

Column 4, Line 48, delete "mounted into" and insert -- movable into -- therefor.

Signed and Sealed this

Twenty-fifth Day of May, 1993

Attest:

MICHAEL K. KIRK

*Attesting Officer*   *Acting Commissioner of Patents and Trademarks*